United States Patent [19]
Onozawa

[11] Patent Number: 4,510,497
[45] Date of Patent: Apr. 9, 1985

[54] RAMARK BEACON APPARATUS

[75] Inventor: Kazuo Onozawa, Tokyo, Japan

[73] Assignee: OKI Electric Industry Co. Ltd., Japan

[21] Appl. No.: 397,691

[22] Filed: Jul. 13, 1982

[30] Foreign Application Priority Data

Jul. 20, 1981 [JP] Japan ................... 56-112312

[51] Int. Cl.³ .................. G01S 7/22; G01S 13/80
[52] U.S. Cl. ................... 343/5 EM; 343/6.8 LC
[58] Field of Search ............ 343/5 EM, 6 R, 6.8 R, 343/6.8 LC

[56] References Cited

U.S. PATENT DOCUMENTS

| | | | |
|---|---|---|---|
| 2,568,265 | 9/1951 | Alvarez | 343/6 R X |
| 2,637,021 | 4/1953 | Silverman | 343/6 R |
| 2,962,707 | 11/1960 | Cleeton | 343/5 EM |
| 3,179,933 | 4/1965 | Hahnel | 343/6 R |
| 3,312,970 | 4/1967 | Bond | 343/6 R |
| 3,964,024 | 6/1976 | Hutton et al. | 343/6.8 LC X |
| 4,129,868 | 12/1978 | Tahara et al. | 343/6.8 R |

Primary Examiner—T. H. Tubbesing
Attorney, Agent, or Firm—Martin Novack

[57] ABSTRACT

A ramark (radar marker) beacon for aiding navigation on a radar screen has been improved by synchronizing a ramark beacon code with a radar pulse. A beacon code having long dots and short dots stops on a radar screen so that the code may be identified by a radar operator. The present ramark beacon has a code pulse generator for amplitude-modulating a transmitter of a beacon, and said code pulse generator is initialized by each received radar pulse, so that a code pulse is synchronized with a radar pulse. The code pulse generated by said code pulse generator has the same period as the period of the received radar pulse.

5 Claims, 8 Drawing Figures

RAMARK BEACON APPARATUS

BACKGROUND OF THE INVENTION

The present invention relates to a ramark beacon apparatus for indicating direction on a marine radar screen. A ramark beacon apparatus is fixed on land, and transmits a pulse signal, which is received by a marine radar, and then, said pulse signal received by the marine radar indicates a direction marker on a radar screen.

Conventionally, a transponder, or a racon has been utilized for indicating a marker on a radar screen for indicating the fixed position on land. However, said racon has the disadvantage that it is sometimes difficult to recognize the position of the racon station since the marker by a racon is a short line on a radar screen, and that short line is sometimes difficult to recognize on a screen. Therefore, a racon is only used for locating a ship within a narrow area.

On the other hand, a ramark beacon apparatus which is fixed on land provides a long marker line extending the whole radius on a radar screen, and therefore, a ramark beacon is used for an initial location of a ship at a long distance.

FIG. 1 is a block diagram of a prior ramark beacon apparatus, which transmits a pulse signal. In the figure, the reference numeral 1 is an antenna, 2 is a transmitter, 3 is a sweep signal generator, 4 is a code generator which modulates the beacon signal with the predetermined code. That code identifies, for instance, the particular ramark beacon station. The sweep signal generator 3 is used for sweeping the transmission frequency of the ramark beacon apparatus so that the ramark beacon signal may be received by any marine radar which uses the radar frequency, for instance, in the 9400 MHz band.

The prior ramark beacon apparatus of FIG. 1 transmits a beacon signal continuously, and the code transmitted by the ramark beacon is of course not synchronized with a radar pulse on a ship. Therefore, the ramark beacon code indicated on the PPI screen (Plan Position Indication) on a ship is indicated as shown in FIG. 2, in which the combination of short dots and long dots is not synchronized with the scanning of a radar screen, and therefore, it is almost impossible to understand the code although the ramark beacon signal is modulated with the particular code. Further, the asynchronized indication of FIG. 2 has the disadvantage that the intensity of a line on a screen is weak, since short dots and long dots are distributed at random. Accordingly, the indication of a ramark beacon on a radar screen looks like a vague line, from which it is impossible to identify a code of the beacon station.

SUMMARY OF THE INVENTION

It is an object, therefore, of the present invention to overcome the disadvantages and limitations of a prior ramark beacon by providing a new and improved ramark beacon apparatus.

It is also an object of the present invention to provide a ramark beacon apparatus which provides a code pulse synchronized with a radar pulse on a radar screen.

The above and other objects are attained by a ramark beacon apparatus comprising a transmitter; a code pulse generator for providing a predetermined code to said transmitter to amplitude-modulate the same; an antenna coupled with said transmitter; a receiver coupled with said antenna; and said code pulse generator being initiated each time said receiver provides a received radar pulse to said code pulse generator so that the code pulse is synchronzied with the radar pulse.

Preferably, the code pulse generated by said code pulse generator has the same period as the period of the received radar pulse.

Preferably, a sweep signal generator is provided for sweeping the transmission frequency of said transmitter.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 3:
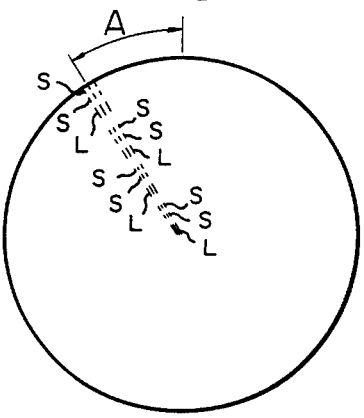
FIG. 3 is a PPI indication on a radar screen according to the present ramark beacon apparatus.

FIG. 3 shows the example of a PPI indication on a radar screen on a ship, and the FIG. 3 shows that a ramark beacon station exists in the direction of A, and the code of that ramark beacon station is indicated by the combination of the long dots L and the short dots S on the screen. As apparatus in FIG. 3, the dots are synchronized by every scanning line, and thus, each long dot and short dot are arranged similarly in the circumferential direction of the screen. Therefore, it is possible to read and identify the code of the ramark beacon station on the radar screen.

Figure 4:
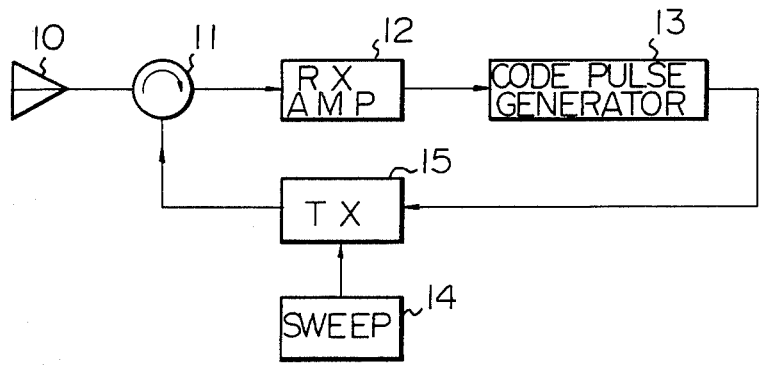
FIG. 4 is a block diagram of the ramark beacon apparatus according to the present invention.

FIG. 4 is a block diagram of the ramark beacon apparatus according to the present invention for indicating the synchronized ramark on a radar screen. In the figure, the reference numeral 10 is an antenna for receiving a radar wave from a ship, and transmitting a ramark beacon wave. The reference numeral 11 is a circulator for using a single antenna commonly in a transmit mode and a receive mode, by rotating an electric wave in the direction of an arrow. The reference numeral 12 is a receiver amplifier, which detects and amplifies the received radar wave and provides a receive radar pulse. The reference numeral 13 is a code pulse generator, which generates a code pulse synchronized with a receive radar pulse provided by the receiver amplifier 12. The code pulse generated by that generator 13 has a duration which is a little longer than the radar pulse period from a ship so that a ramark indicated on a radar screen extends the whole radius of the screen. When the present apparatus receives a radar pulse from a ship, the code pulse generator 13 is initiated so that the code pulse is synchronized with a receive radar pulse, and the code pulse synchronized with the received radar pulse is transmitted.

Figure 1:
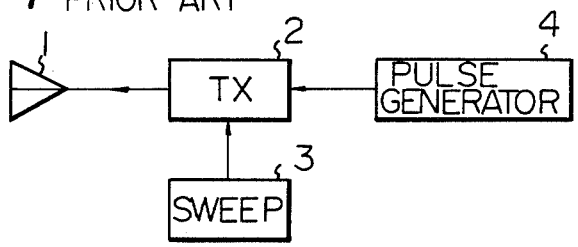
FIG. 1 is a block diagram of a prior ramark beacon apparatus.
Figure 2:
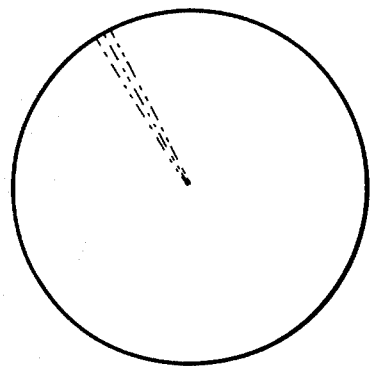
FIG. 2 is a PPI indication on a radar screen in a prior ramark beacon apparatus.

The reference numeral 14 is a sweep generator for the frequency sweep of the transmission wave so that the electric wave of the present apparatus may be received by any radar which uses the particular radar frequency (for instance, the radar frequency is in the 9400 MHz band). The reference numeral 15 is a transmitter which transmits an amplitude-modulated code pulse from the code pulse generator 13 with the frequency according to the output of the sweep generator 14. The structure of the transmitter 15 is the same as that of a prior circuit 2 in a prior ramark beacon apparatus of FIG. 1. The output of the transmitter 15 is applied to the antenna 10 through the circulator 11, and the ramark beacon wave is transmitted in the air from the antenna 1.

When a radar on a ship receives the electric wave transmitted by the beacon apparatus of FIG. 4, the beacon signal is indicated in the direction of the beacon station on the PPI screen of a radar, and the code pulse which is synchronized with a radar pulse is indicated on the screen as shown in FIG. 3. The total length of the code pulse extends to the whole radius of the screen since the duration or the period of the code pulse is almost equal to the pulse repetition period of a radar pulse.

Figure 5:
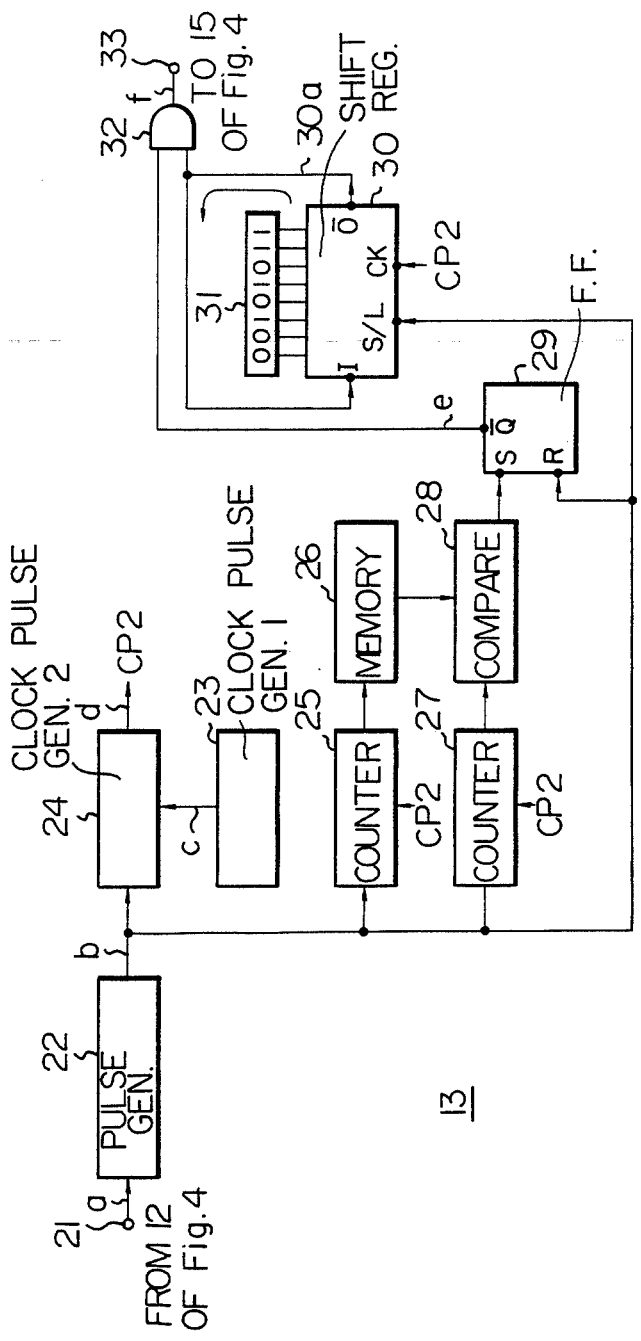
FIG. 5 is a block diagram of the code pulse generator in FIG. 4.

FIG. 5 shows a detailed block diagram of the code pulse generator 13. In the figure, the reference numeral 21 is an input terminal of a received radar pulse (a), which is supplied by the receiver amplifier 12 in FIG. 4, 22 is a pulse generator which is triggered by the receive pulse (a) and generates a narrow waveshaped pulse (b) (see (b) of FIG. 6), 23 is a first clock pulse generator for providing a first clock pulse train (c), which is for instance provided for every 0.1 μsec. The reference numeral 24 is a second clock pulse generator having a frequency divider which is initiated to zero by each pulse (b) and provides the second clock pulse (d) by dividing the first clock pulse (c). The period of the second clock pulse is for instance 2.0 μsec. The reference numeral 25 is a counter for measuring the period of the pulse (b). That counter 25 is initialized to zero by the pulse (b) and counts the number of the second clock pulses (d) until the next pulse (b) is received. Upon receipt of the pulse (b), the counted content of the counter 25 is transferred to and stored in the memory 26, and the counter itself is initialized to zero again. The reference numeral 26 is a memory for storing the pulse repetition time of a radar pulse. The content of the memory 26 is revised by every radar pulse (b). The reference numeral 27 is another counter which is also initiated by the pulse (b), and counts the second clock pulse. The instantaneous content of the counter 27 is applied to the comparator 28. The comparator 28 compares the content of the memory 26 with the instantaneous output of the second counter 27, and when the latter exceeds the former, the comparator provides an output signal.

The reference numeral 29 is a gate signal generator which is implemented by a set-reset type flip-flop, which is set to one status by a set pulse from the comparator 28, and is reset to zero status by the pulse (b). It is assumed that the output (e) of the output terminal $\overline{Q}$ of the gate signal generator is one (high level), when the flip-flop is in reset status.

The reference numeral 30 is a shift register, which can accept a parallel input signal and provides a serial output signal, and 31 is a parallel code pulse generator. The shift register 30 and the code pulse generator 31 compose a basic code pulse generator.

The shift register 30 has a serial signal input terminal (I), a serial signal output terminal ($\overline{O}$), a switching control terminal (S/L) which switches the operation of the shift register 30 itself between the shift operation and the load operation of the new parallel data from the code pulse generator 31, and a clock signal input terminal (CK). The terminals (I) and ($\overline{O}$) are coupled together by a wire 30a, the terminal (S/L) receives a pulse (b) from the pulse generator 22, and the clock signal input terminal (CK) receives the second clock pulse (d). The shift register loads the new data from the code pulse generator 31 when the front end of the pulse (b) is applied to the switching control terminal (S/L) (when the level of the pulse (b) changes from the high level to the low level in (b) of FIG. 6, and then shift register 30 operates to shift the contents of the same every time a clock pulse is applied to the clock signal input terminal (CK).

The reference numeral 32 is an AND circuit which provides a code pulse (f) corresponding to the content of the shift register 30 on the condition that the flip-flop 29 is in reset status. The reference numeral 33 is an output terminal for providing a code pulse (f), which is applied to the transmitter 15 of FIG. 4.

Figure 6:
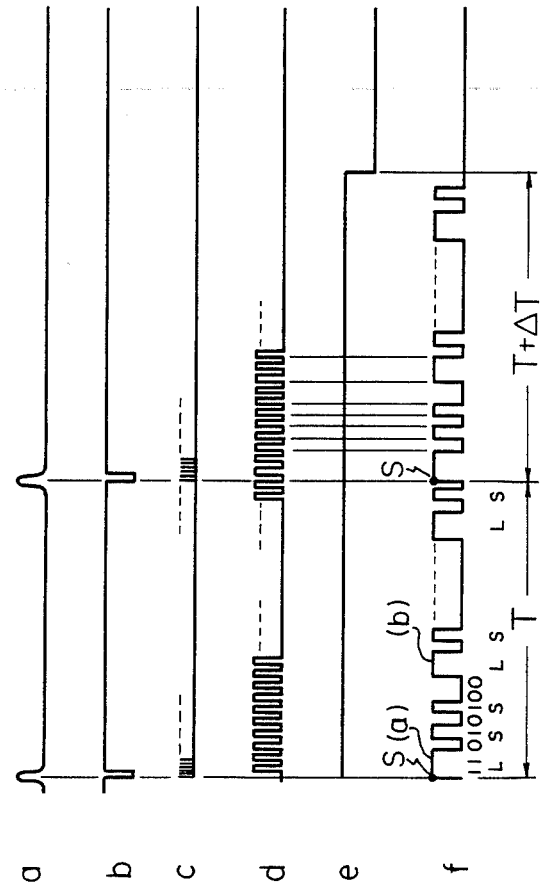
FIG. 6 shows operational time sequence of the apparatus of FIG. 5.

FIG. 6 shows the timing sequence of the received radar pulse (a), the waveshaped pulse (b), the first clock pulse (c), the second clock pulse (d), the gate output pulse (e), and the output code pulse (f). The code pulse of (f) is the sequence of long dots and short dots, which corresponds to the content of the code pulse generator 31. In the present embodiment, the content of the code pulse generator 31 is (11010100), and the code "1" corresponds to the high level of graph (f), and the code "0" corresponds to the low level of graph (f). The two continuous high levels compose a long dot, and a single separated high level composes a short dot, therefore, the basic code in the present embodiment is 11010100=LSS, and that basic code is repetitively transmitted.

In the above configuration, it should be appreciated that when a radar pulse is received, the flip-flop 29 is in reset status, therefore, the AND circuit 32 passes the output series code pulse from the terminal ($\overline{O}$) of the shift register 30 as it is, and that the shift register 30 is initiated by the pulse (b) which is the waveshaped pulse of a received radar pulse. Therefore, every time a radar pulse is received, a code pulse is initiated at the initial point S, and repeats the basic code with 8 bits (the code "11010100") until the next radar pulse is received. The present ramark beacon apparatus recognizes that a radar pulse stops when a radar pulse is not received until the time $T+\Delta T$, where T is the repetition period of radar pulses stored in the memory 26, and $\Delta T$ is a small value as compared with the value T. When no radar pulse is received until that time $T+\Delta T$ elapses, the comparator 28 provides an output signal which sets the flip-flop 29, and then, the AND circuit 32 is closed to prevent the output of the shift register 30. Therefore, when no radar pulse is received, no ramark beacon signal is transmitted. That value $\Delta T$ may be either positive or negative.

The first pulse (a) (see (f) of FIG. 6) in the first period is wider than the first pulse (b) in the second period by (the sum of $\frac{1}{2}$ period of the second clock pulse (d) and $\Delta t$), where $\Delta t$ depends upon each reception radar pulse, and is shorter than the period of the first clock pulse (c), because the first clock pulse (c) is not synchronized with a receive radar pulse. Since Δt gives an error of distance and the undesirable shift of dots on the code pulse on a PPI radar screen, the period of the first clock pulse should be as short as possible. In one embodiment, the repetition period of a radar pulse is 0.5–2.0 msec, and the period of the first clock pulse (c) is 0.1 μsec.

When there are more than two ships in the service area of the present ramark beacon apparatus, the present system receives two series of radar pulses. Even in that case, the present system can provide a synchronized code pulse to each ship, since each ship scans a radar asynchronously, and there is little chance that the present system will receive more than two radar pulses simultaneously.

Figure 7:
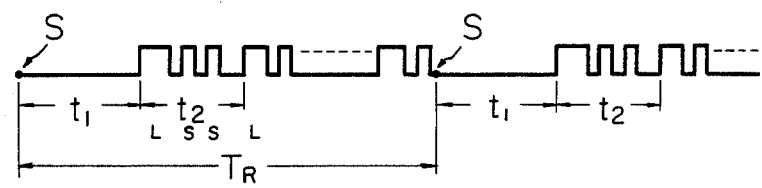
FIG. 7 is an example of the format of a code pulse.
Figure 8:
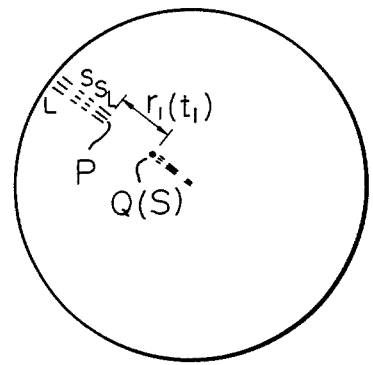
FIG. 8 is a PPI indication on a radar screen by the code pulse of FIG. 7.

FIG. 7 shows an example of a code pulse generated by the shift register 30 of FIG. 5. In FIG. 7, the level of the code is zero for the first $t_1$ duration from the initial point S, and then, the basic code pulse with the period $t_2$ is repeated until the next radar pulse is received. FIG. 8 shows the code indication on a PPI screen of the code of FIG. 7, in which a line $(r_1)$ is indicated corresponding to the initial low level $(t_1)$ of the code pulse. In those figures, the point (Q) corresponds to the initial point S of the code pulse, the point P of FIG. 8 corresponds to the start of the code pulse of the duration $t_2$ of FIG. 7, and the length $(r_1)$ corresponds to the blank duration $t_1$ of FIG. 7. It should be appreciated further that the point (Q) on the PPI screen also corresponds to the location of the ramark beacon apparatus. Accordingly, the code pulse of FIG. 7 may indicate not only the direction of the ramark beacon station, but also the location of the same on a PPI screen.

As described above, according to the present invention, a code pulse indicated on a PPI screen is synchronized with a radar pulse, and therefore, a code pulse indicated on a screen is synchronized with a scanning of a radar. Thus, long dots and short dots of each basic code pulse are arranged on similar positions on a screen. Therefore, it is possible to recognize and identify a code pulse on a radar screen, and further, the intensity of a code pulse on a screen is increased because of the synchronized arrangement of the code pulse.

From the foregoing it will now be apparent that a new and improved ramark beacon apparatus has been discovered. It should be understood of course that the embodiments disclosed are merely illustrative and are not intended to limit the scope of the invention. Reference should be made to the appended claims, therefore, rather than the specification as indicating the scope of the invention.

What is claimed is:

1. A ramark beacon apparatus for providing a marker line on a radar screen comprising:
   a transmitter,
   a code pulse generator for providing a predetermined code to said transmitter to amplitude-modulate the same, and
   an antenna coupled with said transmitter, characterized in that
   a receiver coupled with said antenna is provided, and
   said code pulse generator is operative to be initiated every time said receiver provides a received radar pulse to said code pulse generator so that the code pulse is synchronized with the radar pulse, said code pulse having almost the same pulse repetition period as that of the radar pulse, said code pulse generator further being operative such that said code pulse continues until the next radar pulse is received, and said code pulse transmits a basic code repetitively.

2. A ramark beacon apparatus according to claim 1, wherein said code pulse generator comprises:
   a shift register having at least a serial signal input terminal (I), a serial signal output terminal (O), a switching control terminal (S/L), a clock signal input terminal (CK),
   means for coupling said serial signal input terminal with said serial signal output terminal of said shift register,
   a parallel code pulse generator for providing a predetermined pulse code in parallel to said shift register,
   a flip-flop means which provides an active output signal when a radar pulse is not received,
   an AND circuit which receives the output of said flip-flop means, and the serial output of said shift register, to provide a resultant code pulse synchronized with a received radar pulse,
   said shift register loading the content of said parallel code pulse generator to the same each time a radar pulse is received, and shifting the content of the shift register in a circular manner according to a clock pulse applied to said clock signal input terminal so that an output code pulse of the code pulse generator is synchronized with a received radar pulse.

3. A ramark beacon apparatus according to claim 1, further comprising a sweep signal generator for sweeping the frequency of said transmitter.

4. A ramark beacon apparatus for providing a marker line on a radar screen comprising:
   a transmitter,
   a code pulse generator for providing a predetermined code to said transmitter to amplitude-modulate the same, and
   an antenna coupled with said transmitter, characterized in that
   a receiver is coupled with said antenna, and
   said code pulse generator is operative to be initiated every time said receiver provides a received radar pulse to said code pulse generator so that the code pulse is synchronized with the radar pulse, and said code pulse having almost the same pulse repetition period as that of the radar pulse, said pulse code generator comprising:
   a shift register having at least a serial signal input terminal (I), a serial signal output terminal (O), a switching control terminal (S/L), and a clock signal input terminal (CK),
   means for coupling said serial signal input terminal with said serial signal output terminal of said shift register,
   a parallel code pulse generator for providing a predetermined pulse code in parallel to said shift register,
   a flip-flop means which provides an active output signal when a radar pulse is not received,
   an AND circuit which receives the output of said flip-flop means, and the serial output of said shift register, to provide a resultant code pulse synchronized with a received radar pulse,
   said shift register loading the content of said parallel code pulse generator to the same each time a radar pulse is received, and shifting the content of the shift register in a circular manner according to a clock pulse applied to said clock signal input terminal so that an output code pulse of the code pulse generator is synchronized with a received radar pulse.

5. A ramark beacon apparatus according to claim 4, further comprising a sweep signal generator for sweeping the frequency of said transmitter.

* * * * *